United States Patent
Bains et al.

(10) Patent No.: US 7,281,079 B2
(45) Date of Patent: Oct. 9, 2007

(54) METHOD AND APPARATUS TO COUNTER MISMATCHED BURST LENGTHS

(75) Inventors: Kuljit S. Bains, Olympia, WA (US); John B. Halbert, Beaverton, OR (US); Randy B. Osborne, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 321 days.

(21) Appl. No.: 10/750,154

(22) Filed: Dec. 31, 2003

(65) Prior Publication Data

US 2005/0144375 A1 Jun. 30, 2005

(51) Int. Cl.
*G06F 12/00* (2006.01)
(52) U.S. Cl. .......................... 711/5; 711/154
(58) Field of Classification Search ............ 711/5, 711/154, 118
See application file for complete search history.

(56) References Cited

U.S. PATENT DOCUMENTS

| | | | | |
|---|---|---|---|---|
| 5,448,310 A | * | 9/1995 | Kopet et al. ............... | 348/699 |
| 5,721,874 A | * | 2/1998 | Carnevale et al. .......... | 711/171 |
| 6,151,271 A | * | 11/2000 | Lee ............................ | 365/233 |
| 6,279,116 B1 | * | 8/2001 | Lee ............................ | 713/601 |
| 6,721,864 B2 | * | 4/2004 | Keskar et al. .............. | 711/167 |

OTHER PUBLICATIONS

IBM Technical Disclosure Bulletin, "Bit Vector Algortihm for Detecting Self-Modification in Data Chains", Oct. 1, 1989, vol. 32, Issue 5A, pp. 455-457 (5 pages included in printout).*
Saulsbury, A., et al., "Missing th Memory Wall: The Case for Processor/Memory Integration", Proceedings of the 23rd Annual Intl. Symposium on Computer Architecture, vol. 24(2):90-101 (May 1996).*

* cited by examiner

*Primary Examiner*—Pierre-Michel Bataille
(74) *Attorney, Agent, or Firm*—Ram P. Yadav

(57) ABSTRACT

Memory device having banks of memory cells organized into two groups of banks that share control circuitry and a data buffer to provide an interface to a memory bus, but which are independently operable enough to support unrelated transactions with each group, and can be used to stagger read operations with shortened burst transfers so as to minimize dead time on a memory bus.

20 Claims, 9 Drawing Sheets

METHOD AND APPARATUS TO COUNTER MISMATCHED BURST LENGTHS

BACKGROUND

As processors in computers and other electronic systems continue to operate at ever higher speeds, demands have been placed on memory devices to keep up. As a result, current memory device designs have sought to increase their effective transfer rates on memory buses by providing memory interfaces with burst transfers of data at ever increasing clock rates. However, although it has been possible to increase the transfer rates of memory buses, it has not proven to be so easy to increase the speed of the memory cells within the memory devices, themselves. For read operations, a common answer to this situation is for a memory device to internally prefetch ever greater quantities of data from an open row of memory cells at a time to support burst transfers of data of ever greater quantities of data to minimize proportion of bus cycles used in transferring addresses and/or commands versus transferring data.

Unfortunately, increasing the quantity of data prefetched and the burst length is not necessarily optimal for the architectures of every electronic system, especially computer systems employed as a servers where processors frequently jump about between many different pieces of software and/or pieces of data to support a given piece of software as a result of the demands arising from the many users that servers must typically support at any given time. For servers, this results in a pattern of operation of loading, executing and storing only a small portion of software instructions and/or data at a time before jumping to loading, executing and storing another small portion of software instructions and/or data, likely resulting in far more jumping about between different locations in memory devices to read and write what are likely smaller quantities of bytes than the quantities of bytes that current memory devices are designed to transfer in a burst. In other electronic systems, such as a single-user computer (e.g., a desktop computer, notebook computer, handheld computer, etc.) increased burst length is more likely to be helpful since, generally speaking, the user of such a single-user computer does not usually choose to work with so many different pieces of software and/or data at any given time, and so jumping around between different locations within a memory device occurs less frequently. So, the general tendency of such single-user computers is to execute a greater number of instructions between jumps than servers, tending to cause more of the quantities of data prefetched from a row of memory cells and transferred in burst transfers by current memory devices to actually be used.

Another factor aggravating the problem of excessive quantities of bytes being prefetched and transferred in burst transfers for servers arises from the expectation that servers meet standards of reliability and immunity to hardware errors that single-user computers don't. Memory systems in servers often require wider memory buses (or multiple memory buses operated in parallel to achieve the equivalent of a single wider memory bus) to increase the number of bits transferred during a given clock cycle to support any of a number of possible schemes for error detection, error correction, error scrubbing, chipkill, etc. Unfortunately, this use of wider (or multiple parallel) memory bus configurations actually multiplies the already excessive quantities of data prefetched and transferred in burst transfers, usually by a factor of two or four.

The fact that single-user computers vastly outnumber servers gives rise to a tendency for memory devices to be designed with design trade-offs that are often made more in favor of single-user computers than for servers. The result is the preservation of the approach of prefetching and transferring large quantities of data, and even where the ability is provided in some current memory devices to program a memory device to specify a smaller quantity of data to be prefetched and transferred, limits are typically placed on how small a quantity can be specified. However, in one effort to accommodate the growing disparity between increasing quantities of data prefetched and transferred in a burst versus the quantities of data actually needed, some current memory devices provide the ability to selectively bring about an early termination of a burst transfer so as to limit the number of bytes transferred in a burst with a "burst terminate" command, a "burst chop" command embedded in a read command, etc. Unfortunately, the use of a burst terminate command takes up memory bus cycles to transmit the command, and the command must be timed to be transmitted either during or just before the clock cycle during which the last desired byte(s) are transferred, which may also momentarily preclude the use of a memory bus for other transfers. Regardless of how a memory device is instructed to terminate a burst, early, a delay is still incurred (causing valuable memory bus cycles to pass, unused—i.e., "dead time" on a memory bus) to allow a memory device designed to prefetch a large quantity of data to discontinue prefetching an amount of unwanted data, and to become ready to carry out another memory operation. Given that processors used in both typical servers and single-user computers tend to have cache systems with cache rows of only a few quadwords in width, server computer systems are currently more likely to frequently use mechanisms to terminate burst transfers, early. However, as the disparity between memory bus speeds and memory cell speeds continues to increase, it is expected that the disparity between quantities of data prefetched and transferred in complete burst transfers will increase, and it is expected that even single-user computers will start making frequent use of mechanisms to terminate burst transfers, early.

BRIEF DESCRIPTION OF THE DRAWINGS

The objects, features, and advantages of the present invention will be apparent to one skilled in the art in view of the following detailed description in which.

DETAILED DESCRIPTION

In the following description, for purposes of explanation, numerous details are set forth in order to provide a thorough understanding of embodiments of the present invention. However, it will be apparent to one skilled in the art that these specific details are not required in order to practice the present invention as hereinafter claimed.

Although the following discussion centers on DRAM devices, it will be understood by those skilled in the art that the present invention as hereinafter claimed may be practiced in support of any type of memory device providing some form of lower power state. It will also be understood by those skilled in the art that although the following discussion centers on memory devices in which memory cells are organized in two dimensional arrays of rows and columns within banks, the memory cells may be organized in any of a number of ways, including arrays of more than two dimensions, with various forms of interleaving, content-addressable, etc. Also, although at least part of the following discussion centers on memory within computer systems, it will be understood by those skilled in the art that the present invention as hereinafter claimed may be practiced in connection with other electronic systems.

Figure 1:
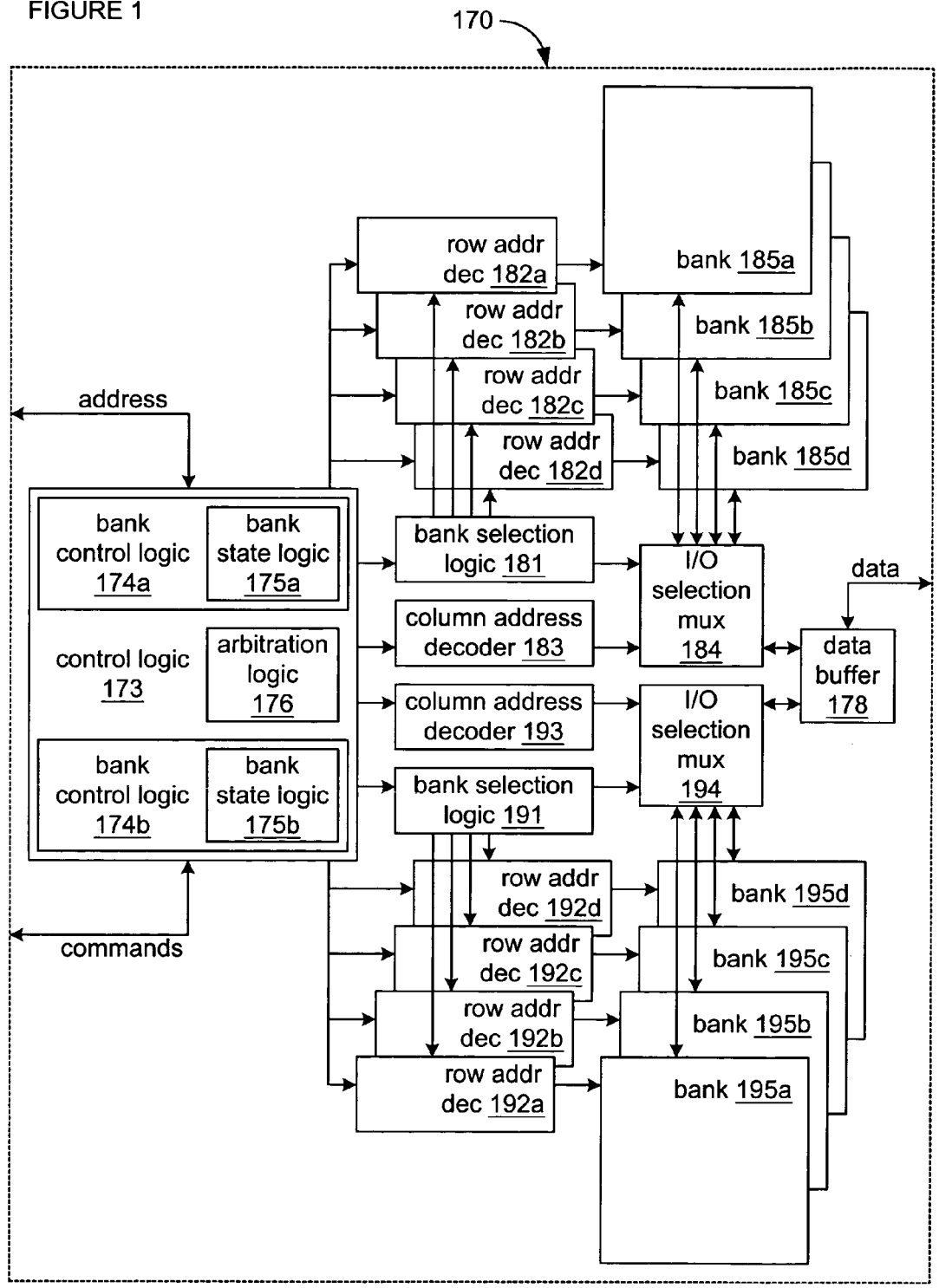
FIG. 1 is a block diagram of an embodiment employing a memory device.

FIG. 1 is a block diagram of an embodiment employing a memory device. Memory device 170 is made up, at least in part, of control logic 173, bank selection logics 181 and 191, row address decoders 182a-d and 192a-d, column address decoders 183 and 193, I/O selection multiplexers 184 and 194, banks 185a-d and 195a-d, and data buffer 178. Control logic 173 receives addresses and/or commands from another device external to memory device 170, such as a memory controller (not shown), and operates bank selection logics 181 and 191, row address decoders 182a-d and 192a-d, and column address decoders 183 and 193, all of which are coupled to logic 173, to carry out memory operations indicated by the received addresses and/or commands. Bank selection logics 181 and 191, and row address decoders 182a-d and 192a-d are coupled to each other and cooperate to select a given row within a given one of banks 185a-d or 195a-d (to which row address decoders 182a-d and 192a-d, respectively, are coupled) to which a memory operation is to be directed. Bank selection logics 181 and 191, and column address decoders 183 and 193 are both coupled to I/O selection multiplexers 184 and 194, and cooperate to select the given column(s) within a given one of banks 185a-d or 195a-d (to which I/O selection multiplexers 184 and 194 are further coupled) to which a memory operation is to be directed. Data buffer 178 is coupled to I/O selection multiplexers 184 and 194, and provides an interface to exchange data with another device external to memory device 170, such as a memory controller.

Banks 185a-d make up a first group of banks of memory that is able to be operated largely independently of a second group of banks of memory made up of banks 195a-d. Aiding in providing for the independent nature of the operation of the first and second groups of banks is the provision of separate bank selection logic 181, row address decoders 182a-d, column address decoder 183 and I/O selection multiplexer 184 for the first group, and bank selection logic 191, row address decoders 192a-d, column address decoder 193 and I/O selection multiplexer 194 for the second group. In some embodiments, bank selection logic 181, row address decoder 182a-d, column address decoder 183 and I/O selection multiplexer 184 are coupled, either directly or indirectly, to control logic 173 through address and/or other signal lines that are separate from those used to couple bank selection logic 191, row address decoder 192a-d, column address decoder 193 and I/O selection multiplexer 194 to control logic 173. Although control logic 173 receives addresses and commands for both the first and second groups of banks, separate information pertaining to the state of each of the first and second groups of banks is stored within control logic 173. In some embodiments, this state information for each of the first and second groups of banks is stored separately for the first and second groups within bank control logics 174a and 174b, and perhaps within bank state logics 175a and 175b, respectively.

In some embodiments, it may be deemed desirable for control logic 173 to provide arbitration logic 176 to address occurrences of the first and second groups of banks being operated by an external device such that a conflict over access to data buffer 178 arises. Arbitration logic 176 may employ one or more simple algorithms to resolve conflicts, such as always prioritizing read operations in which one of these two groups is to output data to an external device over write operations in which the other of these two groups is to receive data from an external device for storage. Various other algorithms to address other types of conflicts may be employed, although as those skilled in the art will readily recognize, if memory device 170 is correctly controlled by an external device, such as a memory controller, such conflicts between the first and second groups should not arise.

The independent nature of the operation of the first and second groups of banks may provide the ability to compensate for inefficiencies in reading of data from one of these two groups arising from a needed early termination of the bursting of data during a read operation by timing the carrying out of another transaction with the other of these two groups so as to minimize the number of clock cycles during which there is inactivity between memory device 170 and another external device, such as a memory controller. In other words, for example, if data is read from the first group, but the burst length is longer than is needed to convey only the data that is required, then an external device may signal to control logic 173 via an explicit burst terminate command, a burst chop command embedded within a read command that specifies a quantity to limit a burst transfer to, or other mechanism that the burst of data being output by the first group is to be cut short. However, although cutting short the burst length of the output of data by the first group may be desirable to prevent the unnecessary transmission of unneeded data, it will then become necessary to wait for a period of time before the first group will have fully stopped all internal functions entailed in that burst transmission and become ready to carry out another operation (time may be needed to stop the internal prefetching of a quantity of data needed to support the full length of the burst transfer). Instead of waiting this period of time and then engaging the first group in carrying out another operation, it may be possible to have already prepared to carry out another transfer with the second group while the first group was preparing to output a burst of data or while the first group was still outputting a burst of data so that the second group may next be engaged in an operation while time is allowed for the first group to be readied for another operation. The operation carried out with the second group of banks may or may not be related to the read operation with the first group that is terminated early. Also, this use of two groups to essentially hide the period of time required for one group to become ready to carry out another memory operation while another group is engaged in a memory operation relies on there actually being a memory operation to be carried out that is directed to the other group. Such hiding of the period of time required for a group to become ready to carry out another memory operation is not possible of the next memory operation to be carried out is directed at the same group, because in that case, the next memory operation cannot begin until the period of time required for that group to become ready to carry out another memory operation must be allowed to elapse.

Figure 2:
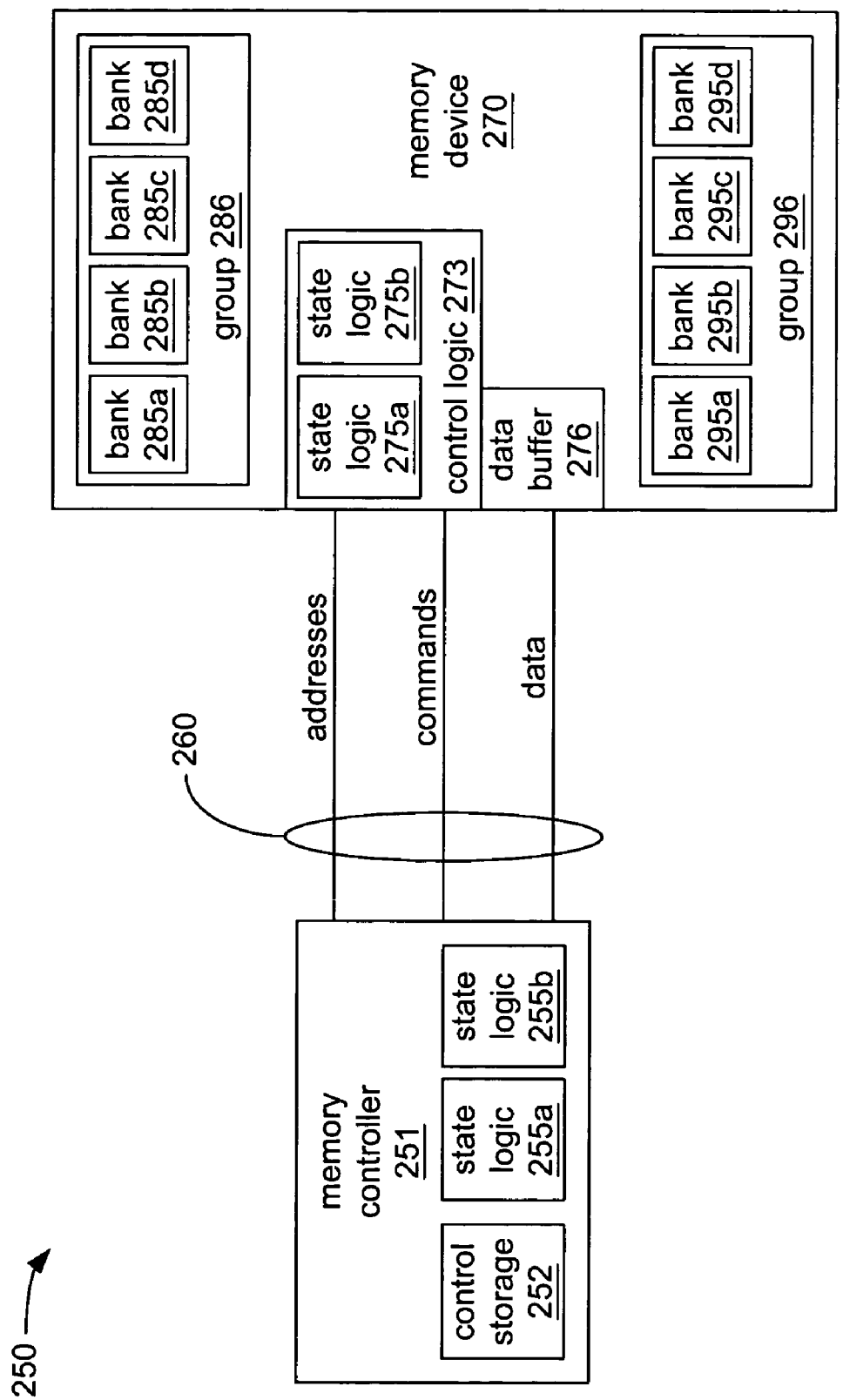
FIG. 2 is a block diagram of an embodiment employing a memory system.
Figure 3A:
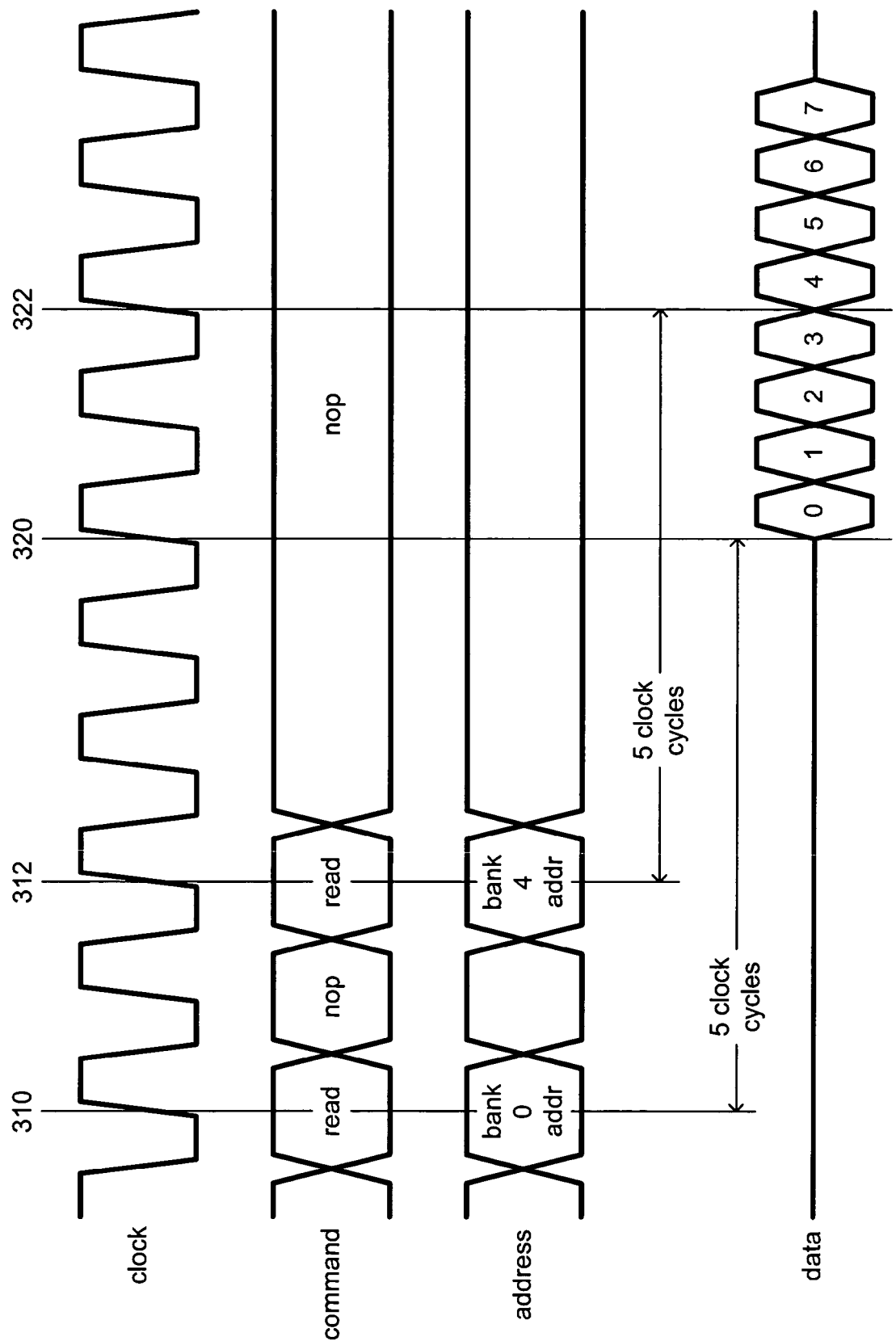
FIGS. 3a and 3b are timing diagrams of embodiments of interaction between a memory controller and a memory device.
Figure 3B:
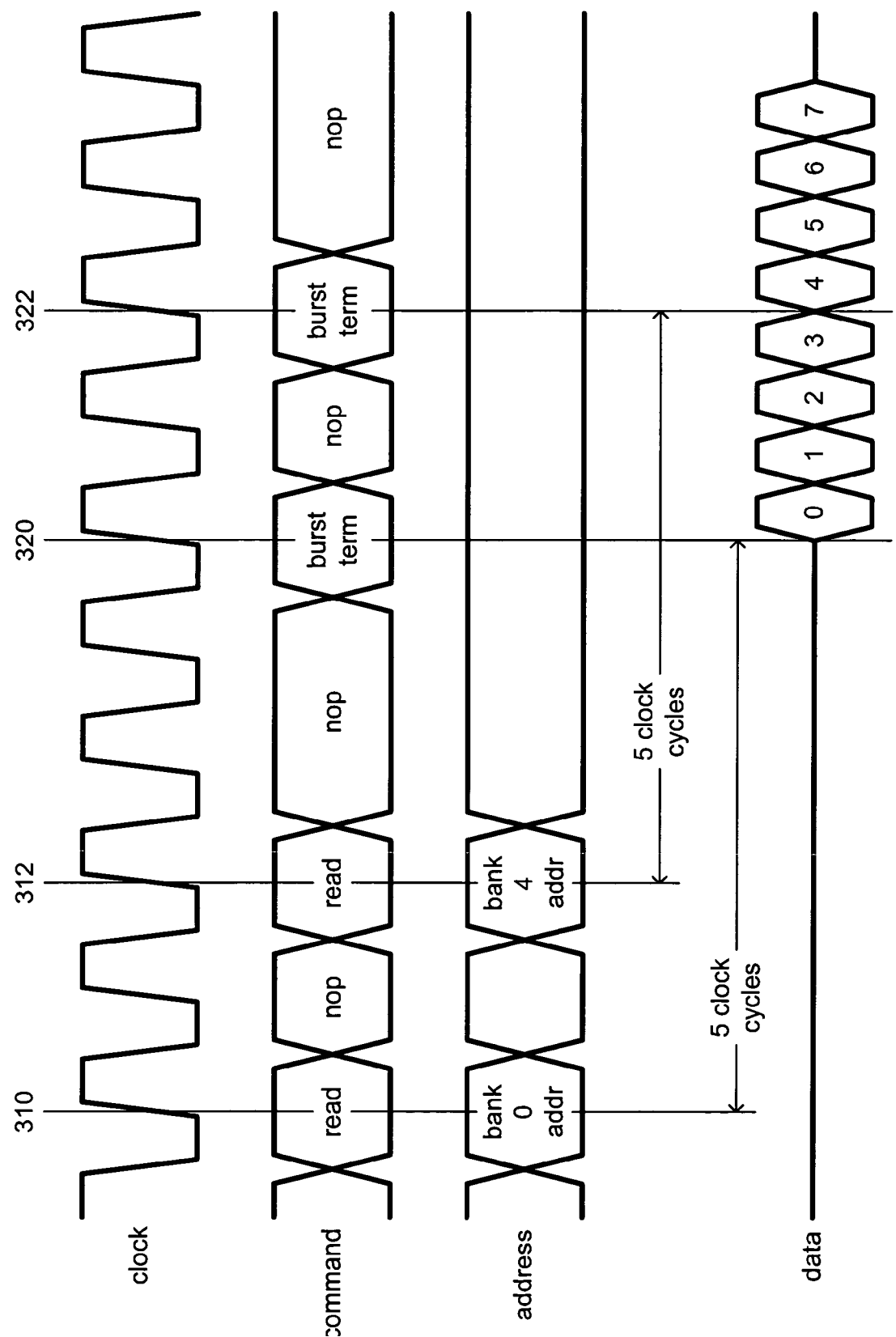

FIG. 2 is a simplified block diagram of an embodiment employing a memory system, and FIGS. 3a and 3b are timing diagrams of embodiment of interactions between a memory controller and a memory device to transfer data. Memory system 250 is made up, at least in part, of memory controller 251 and memory device 270 coupled together via memory bus 260. Those skilled in the art of the design of memory systems will readily recognize that FIG. 2 depicts an example of a relatively simple memory system, and that alternate embodiments are possible in which the exact arrangement and configuration of components may be reduced, augmented or otherwise altered without departing from the spirit and scope of the claimed invention. For example, although memory system 250 is depicted as having a single memory device 270 coupled through a single memory bus 260, it will be readily understood by those skilled in the art that other possible embodiments of memory system 250 may be made up of multiple buses coupling differing numbers of memory devices.

Memory controller 251 controls the operations carried out by memory device 270 as part of providing another device (not shown) coupled to memory controller 251, such as a processor, I/O controller, etc., with access to memory device 270. Specifically, another device coupled to memory controller 251 issues commands to memory controller 251 to store data within and/or to retrieve data from memory device 270. Memory controller 251 receives these commands and relays them to memory device 270 in a format having timing and protocols compatible with memory bus 260. In effect, memory controller 251 coordinates accesses made to memory cells within memory device 270 in answer to read and write commands from another device.

Memory bus 260 may be made up of various separate address, control and/or data signal lines to communicate addresses, commands and/or data, either on separate conductors or on shared conductors in different phases occurring in sequence over time in a multiplexed manner. Alternatively, or perhaps in conjunction with such separate signal lines, addresses, commands and/or data may be encoded for transfer using various encoding algorithms and/or may be transferred in packets. Memory bus 260 may also communicate parity and/or error checking and correction (ECC) signals for addresses, commands and/or data. As those skilled in the art will readily recognize, many forms of timing, signaling and protocols may be used in communications across memory bus 260. The exact quantity and characteristics of the various signal lines making up various possible embodiments of memory bus 260 may be configured to be interoperable with any of a number of possible memory interfaces, including widely used past, current day or new interfaces and/or types of memory devices, including possibly FPM (fast page mode) memory devices, EDO (extended data out), dual-port VRAM (video random access memory), window RAM, SDR (single data rate), DDR (double data rate), DDR2, RAMBUS™ DRAM, etc. In embodiments where activity on various signal lines is meant to be coordinated with a clock signal (as in the case of a synchronous memory bus), one or more of the signal lines, perhaps among the control signal lines, may serve to transmit a clock signal over memory bus 260. Alternatively, various algorithms may be employed to embed/encode a clock within other signals.

Memory device 270 is made up, at least in part, of groups 286 and 296, in which are memory cells organized into arrays of rows and columns forming banks 285a-d and banks 295a-d, respectively, along with control logic 273 and data buffer 276. Control logic 273 is coupled to memory bus 260 to receive at least addresses and commands from memory controller 251 indicating memory operations to be carried out, while data buffer 276 is coupled to memory bus 260 to either output data onto memory bus 260 or receive data from memory bus 260 as part of either read or write operations, respectively. Within control logic 273, separate information pertaining to the current state of groups 286 and 296 is stored, perhaps separately within state logics 275a and 275b, respectively. This separate state information for each of groups 286 and 296 is accessed by control circuitry within control logic 273 that is designed and/or programmed to be able to carry out operations on each one of groups 286 and 296 in a manner that is independent of the other group, i.e., able to carry out operations on each one of these groups that are unrelated to the operations carried out on the other group.

In some embodiments, the physical implementation of memory device 270 may be as a single memory integrated circuit (memory IC) with a data interface wide enough to accommodate the full width of the data portion of memory bus 260 (e.g., all of data bits 0-63 of a memory data path made up of data bits 0-63), and the depiction of memory device 270 is then meant to clarify the internal components within a single memory IC. In other embodiments, memory device 270 is made up of multiple memory ICs assembled together to function in parallel as if they were a single memory IC in a manner well known to those skilled in the art of the design of a memory module such as a SIMM (single inline memory module), SIPP (single inline pin package), DIMM (dual inline memory module), PC Card, or any of a variety of other forms of memory module as those skilled in the art will recognize. In such embodiments where memory device 270 is made up of multiple parallel memory ICs, each individual memory circuit is coupled to receive identical sets of address and command signals, but are each coupled to only a subset of the full width of the data portion of memory bus 260 (e.g., only data bits 0-3 of a memory data path made up of data bits 0-63 to one memory device, only bits 4-7 to another memory device, and so on), and the depiction of memory device 270 is then meant to be an architectural view of the manner in which the combination of parallel memory ICs function together as a whole, it being understood that the components depicted in this architectural view are actually duplicated within each and every one of the memory ICs.

In support of the independently operable nature of groups 286 and 296 within memory device 270, in some embodiments, memory controller 251 may provide separate state logics 255a and 255b in which information pertaining to the current state of groups 286 and 296, including the state of operations being carried out on each of groups 286 and 296, respectively, is separately maintained in a manner that may be akin to groups 286 and 296 being controlled as if they were altogether separate memory devices. With such provisions both within memory device 270 and memory controller 251, memory controller 251 may operate memory device 270 to carry out entirely unrelated memory operations on each of groups 286 and 296. Alternatively, memory controller 251 may operate memory device 270 to arrange the carrying out a plethora of memory operations in rapid succession, perhaps alternating between groups 286 and 296 so that while a delay is being incurred to allow one of the two groups to carry out a portion of a memory operation that does not entail use of memory bus 260 (including making preparations to become ready for another memory operation), the other of the two groups carries out a portion of a memory operation that does entail use of memory bus 260. In this way, it may be possible to minimize occurrences of lengthy periods of time in which there is no activity on memory bus 260 for a number of clock cycles (i.e., so called "dead cycles").

Referring to both FIGS. 2 and 3a, in an example of employing the independently operable nature of groups 286 and 296 to minimize lengthy periods of dead cycles between a read operation from bank 285a in group 286 and a read operation from bank 295a in group 296, memory controller 251 checks the current state of group 286 stored in state logic 255a, as well as the current status of group 296 stored in state logic 255b. Upon determining that the row to be read from bank 285a and the other row to be read from bank 295a are both open, memory controller 251 transmits a read command and the address of the row in bank 285a across memory bus 260 at time point 310 to read from that row in bank 285a. After waiting an extra cycle of the clock so as to offset the timing of a second burst transfer to avoid conflicting with the first, memory controller 251 transmits another read command and the address of the other row in bank 295a across memory bus 260 at time point 312 to read from that other row in bank 295a. At time point 320, which is 5 clock cycles from time point 310 where the corresponding read command was given, memory device 270 begins transmitting data in a burst from the row in bank 285a of group 286 across memory bus 260. Through whatever mechanism is supported by a given implementation of memory bus 260, memory device 270 is somehow signaled to terminate or shorten the burst transfer to output the contents of the row in bank 285a such that only four quadwords are output from that row, thus ending that burst transfer at time point 322. At time point 322, which is 5 clock cycles from time point 312 where the corresponding read command was given, memory device 270 begins transmitting data in a burst from the row in bank 295a of group 296 across memory bus 260. Again, through whatever mechanism is supported by memory bus 260, memory device 270 is signaled to end the burst transfer from the other row in bank 295a such that only four quadwords are output from that row. An advantage afforded by employing the independently operable nature of groups 286 and 296 as just described is that as bank 285a and the logic associated with both group 286 and bank 285a both end the burst transfer from bank 285a and then recover from carrying out the burst transfer in preparation for carrying out another memory operation, bank 295a is engaged in carrying out the other burst transfer with the result that available bandwidth on memory bus 260 for transferring data is not wasted. As a result, obtaining data from these two rows took less time than would be possible were both rows within the same bank or within a memory device in which the banks are not organized into two or more groups.

Although, as those skilled in the art will readily recognize, any of a variety of mechanisms may have been used in signaling memory device 270 to end both burst transfers early so as to limit the burst lengths of both burst transfers to only four quadwords, FIG. 3b, duplicates the depiction of the read transfers of FIG. 3a, but additionally depicts one form of mechanism to provide such a signal. At time point 320, just as the burst transfer of data from the row in bank 285a begins, memory controller 251 transmits a burst terminate command to signal that the burst is to end after only four quadwords are transferred starting at time point 320, thereby causing this burst transfer to end at time point 322. Similarly, at time point 322, just as the burst transfer from the other row in bank 295a begins, memory controller 251 transmits a burst terminate command to signal that the burst is to end after only four quadwords are transferred starting at time point 322. Just as the mechanism for communicating early termination of a burst transfer may be highly varied, the exact timing and quantity of data signified by a burst terminate command may be altered between implementations of memory bus 260.

Although both FIGS. 3a and 3b depict only four quadwords being allowed to be transferred in each burst transfer before these burst transfers are ended, it will be readily apparent to those skilled in the art that each burst transfer may be allowed to proceed until any given quantity of data has been transferred before the burst transfers are ended. In various embodiments, the choice of quantity of data that is permitted to be transferred in each burst transfer may be, at least partly, based on the size of a cache line within a processor or other device. In other embodiments, the burst length that burst transfers are permitted to reach before early termination is invoked may be varied for each read operation depending on the nature of the device requesting memory controller 251 to obtain data from memory device 270. For instance, a processor may have cache lines of four quadwords in width, while a disk I/O controller with bus mastering capability may have cache lines or a buffer of greater width. Characteristics such as cache line width may be part of the information stored by configuration storage 252 for use in determining allowable burst lengths, perhaps along with information concerning the maximum burst length for which memory device 270 has been configured if memory device 270 allows the maximum quantity of data internally prefetched and transferred in a burst transfer to be set by memory controller 251 or in other ways. In various embodiments, information concerning the number of banks and/or groups within memory device 270 may be stored by configuration storage 252 for use in determining which read and/or write operations to choose as the next operation for each group to make efficient use of the independent operability of groups 286 and 296.

Figure 4A:
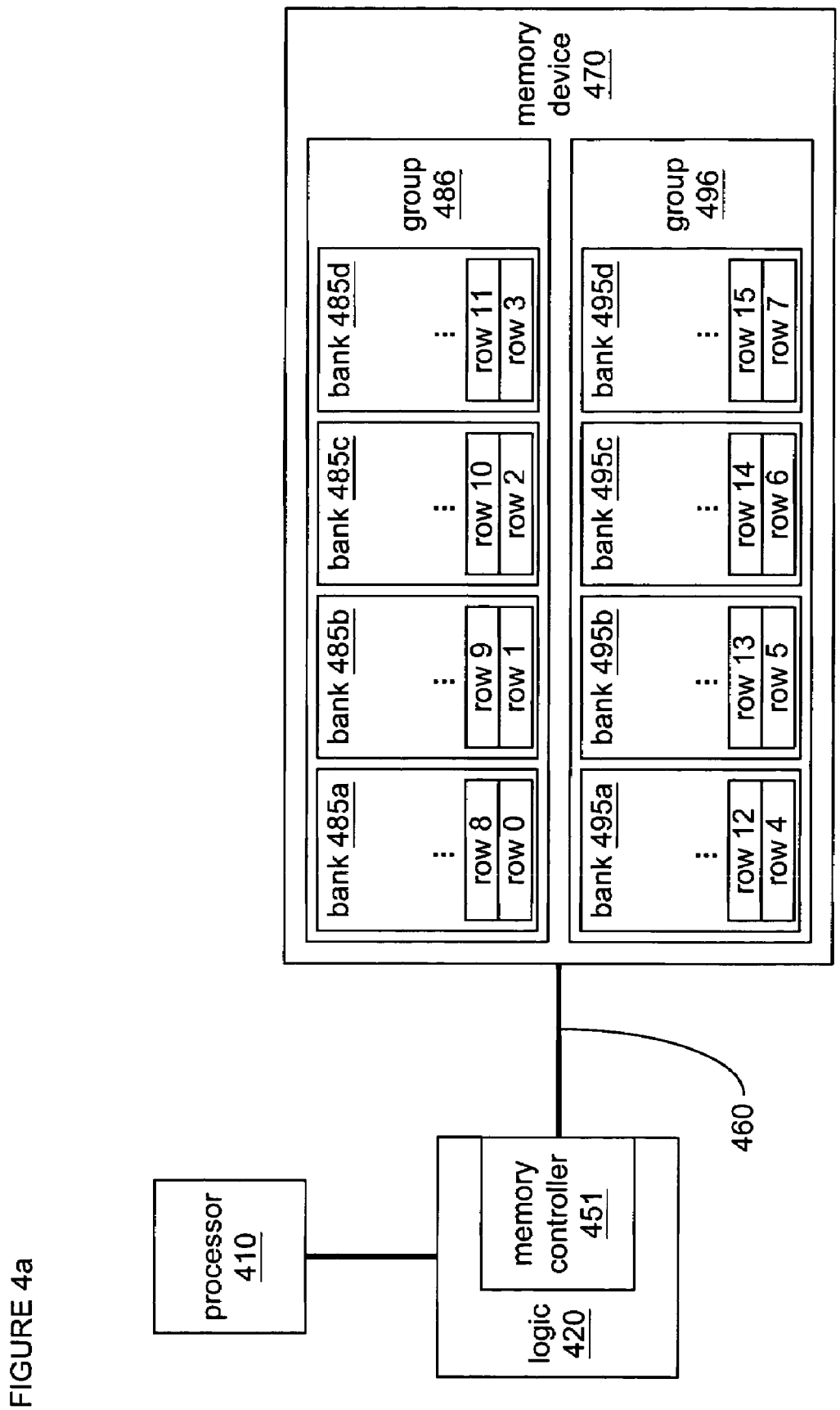
FIGS. 4a, 4b and 4c are block diagrams of embodiments employing various mappings of rows into addressable memory space.
Figure 4B:
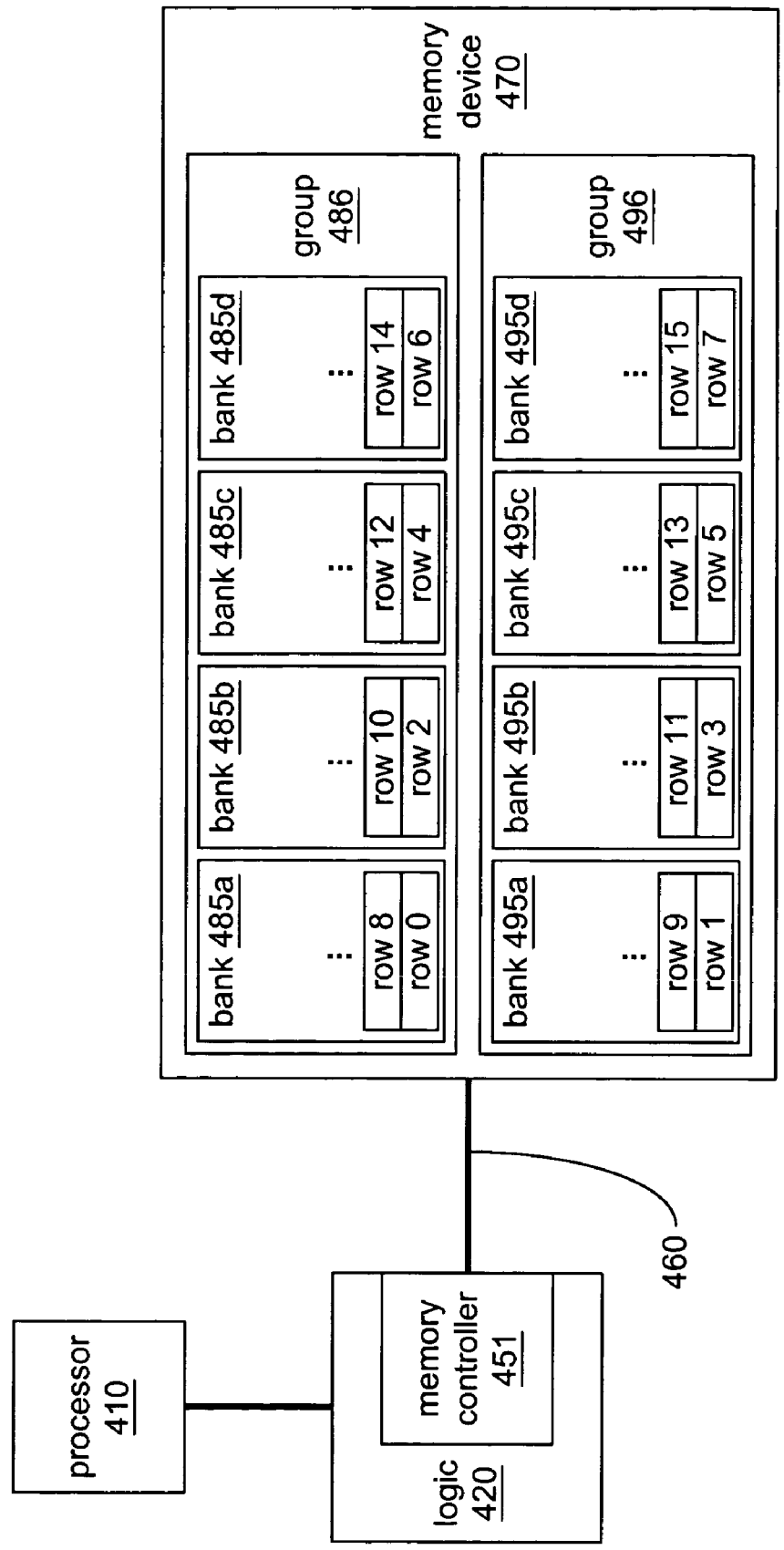
Figure 4C:
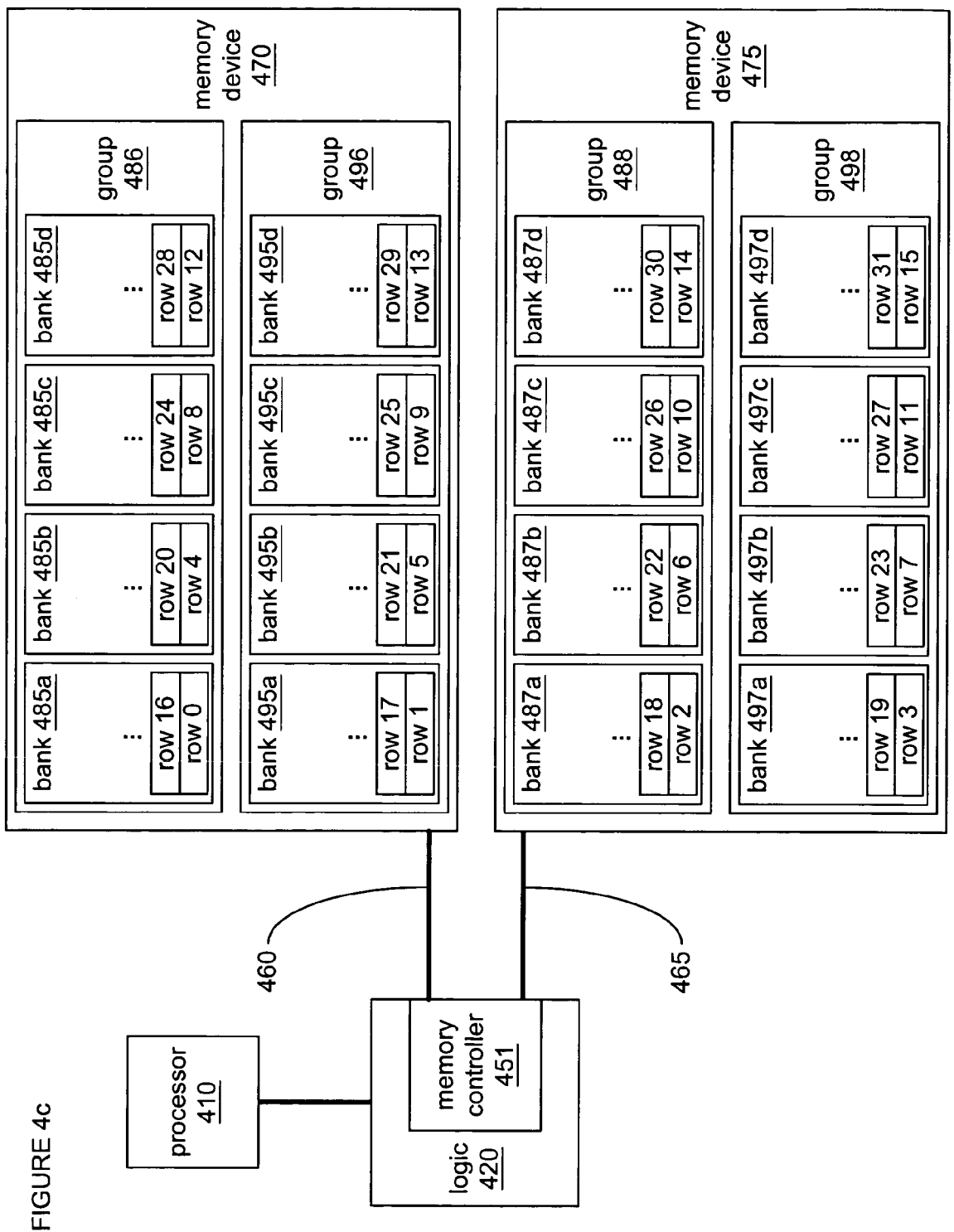

FIGS. 4a, 4b and 4c are block diagrams of embodiments employing a computer system. In FIGS. 4a and 4b, computer system 400 is, at least in part, made up of processor 410, logic 420, memory bus 460 and memory device 470. In FIG. 4c, computer system 400 is, at least in part, made up of processor 410, logic 420, memory buses 460 and 465, and corresponding memory devices 470 and 475. These components make up a form of core of computer system 400 capable of executing machine readable instructions that may be stored within memory device 460 (and perhaps, memory device 465) and/or within other devices of computer system 400 (not shown). However, as those skilled in the art will readily recognize, these are but a small number of examples of possible forms of core of computer system 400, and that computer system 400 may also be further made up of other buses and devices not shown. Logic 420 is coupled to processor 410, and performs various functions in support of the execution of instructions by processor 410, including controlling and providing processor 410 with memory controller 451 through which processor 410 is provided with access to memory device 470 (and perhaps, memory device 475) to which logic 420 is further coupled via memory buses 460 (and perhaps, memory bus 465).

In various embodiments, processor 410 could be any of a variety of types of processor including a processor capable of executing at least a portion of the widely known and used "x86" instruction set originated by Intel Corporation, a corporation of Santa Clara, Calif. Also, in various possible embodiments, there could be more than one processor along with additional buses and/or devices to provide support for more than one processor (not shown). Also, as previously discussed, in various embodiments, memory devices 470 and 475 could be any of a variety of types of random access memory (RAM) including fast page mode (FPM), extended data out (EDO), single data rate (SDR) or double data rate (DDR) forms of synchronous dynamic RAM (SDRAM), or RAM employing the RAMBUS™ interface or other interfaces.

It should be noted for the sake of clarity in the discussion to follow that FIGS. 4*a-c* depict various embodiments of the mapping of rows of memory cells into an address space used by at least processor 410 to select locations within memory device 470 at which to store and retrieve data. These rows have been numbered, and the numbering is intended to depict the order in which these rows are contiguously mapped, each row followed immediately by the next row in turn, into an address space starting with row 0, then followed immediately after where row 0 ends in the address space by row 1, then by row 2, then by row 3, and so on, incrementing through an unbroken sequence of addresses.

In FIG. 4*a*, memory device 470 is made up, at least in part, of groups of memory banks 486 and 496, with banks 485*a-d* making up group 486 and banks 495*a-d* making up group 496. The rows within banks 485*a-d* and 495*a-d* have been mapped by memory controller 451 in a manner that may prove appropriate for use in a single-user form of computer system 400. As depicted, the mapping of the addressable memory space of computer system 400 has arranged such that row 0 is mapped into bank 485*a*, followed by row 1 being mapped into bank 485*b*, row 2 into bank 485*c*, row 3 into bank 485*d*, and then followed by row 4 being mapped into bank 495*a*, row 5 into bank 495*b*, and so on. This mapping of rows across all 4 banks within each group before jumping to the other group may be done in recognition of the tendency for there to not be as much jumping between pieces of software and/or data in a single-user computer system as might be expected in a server computer system.

In FIG. 4*b*, memory device 470 is largely identical to its counterpart of FIG. 4*a*, except that the rows within memory device 470 have been mapped by memory controller 451 in a manner that may prove appropriate for use server form of computer system 400. As depicted, the mapping is such that row 0 is mapped into bank 485*a*, followed by row 1 being mapped into bank 495*a*, row 2 into bank 485*b*, row 3 into bank 495*b*, row 4 into bank 485*c*, row 5 into bank 495*c*, and so on. This mapping of rows such that the ordering of rows alternates between group 486 and 496 between each adjacent mapped bank may be done in recognition of the tendency for more frequent jumping between smaller quantities of lines of software code and/or more frequent jumping between data sets while running a single piece of software to support multiple users.

In FIG. 4*c*, a mapping of rows much like that of FIG. 4*b* is employed where each row in sequence is mapped into a bank in a different group, except that there are two memory devices, namely memory devices 470 and 475, providing four groups, and each coupled to memory controller 451 through a separate one of a pair of memory buses 460 and 465. The use of a pair of memory buses (sometimes also referred to as "channels") may be desirable in a server form of computer system 400 to accommodate the use of parity, error detection, error correction, error scrubbing, chipkill or other mechanisms requiring a number of additional bits with each several bytes to implement some form of memory system fault tolerance.

Figure 5:
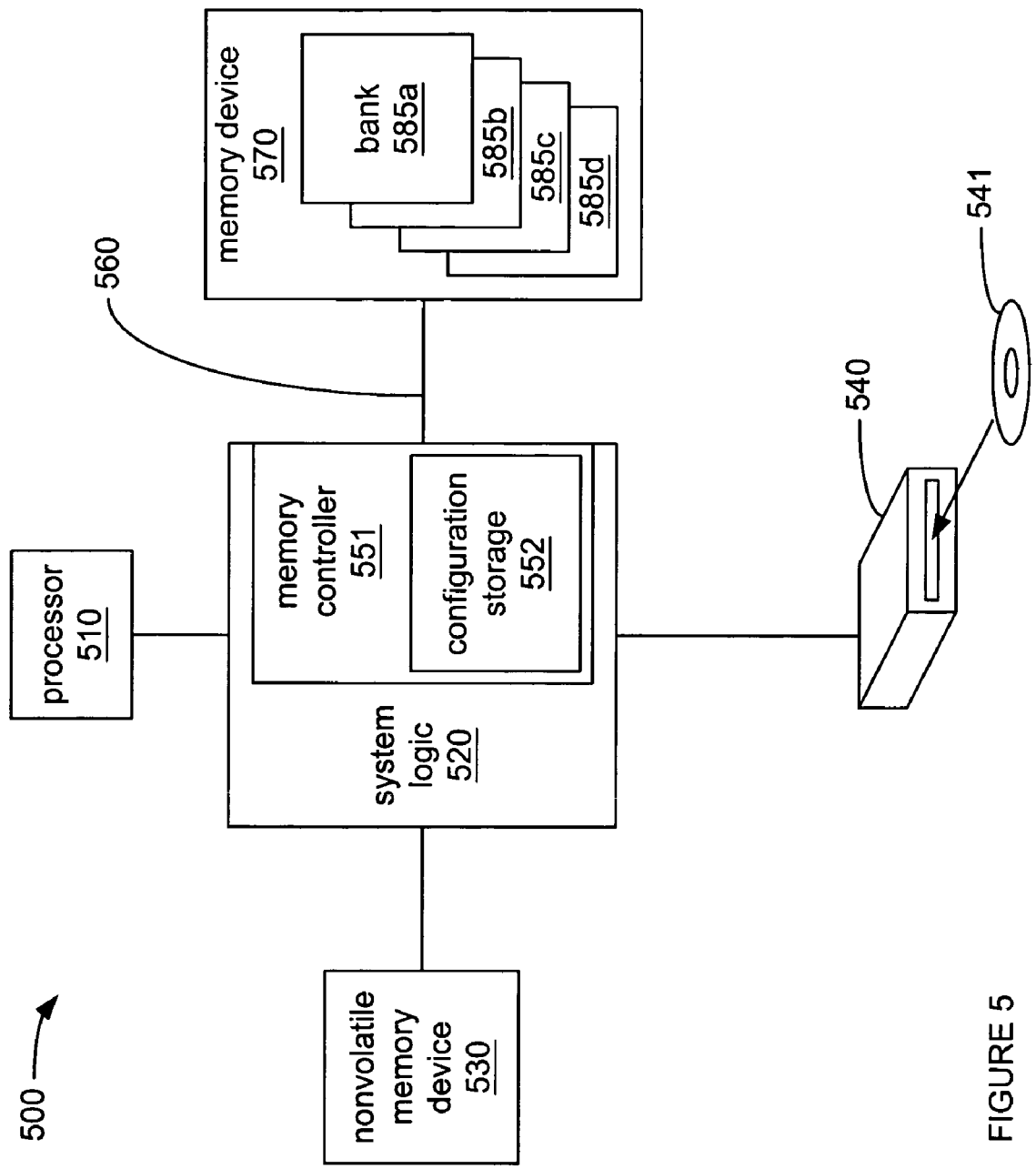
FIG. 5 is a block diagram of an embodiment employing a computer system.

FIG. 5 is another block diagram of an embodiment employing a computer system. In a manner not unlike computer systems 400 of FIGS. 4*a-c*, computer system 500 is, at least in part, made up of processor 510, logic 520, memory controller 551, memory bus 560 and memory device 570. In various embodiments, processor 510 could be any of a variety of types of processor, and there could be more than one processor. In various embodiments, memory device 570 could be made up of one or more memory devices of any of a variety of memory technologies, and memory controller 551 provides an appropriate interface for memory 570 across memory bus 560, regardless of the type of memory.

In some embodiments, logic 520 is coupled to and provides processor 510 with access to storage device 540 by which data and/or instructions carried by storage media 541 may be accessed. Storage media 541 may be of any of a wide variety of types and technologies as those skilled in the art will understand, including CD or DVD ROM, magnetic or optical diskette, magneto-optical disk, tape, semiconductor memory, characters or perforations on paper or other material, etc. In some embodiments, nonvolatile memory device 530 is coupled to logic 520 (or other part of computer system 500) and provides storage for an initial series of instructions executed at a time when computer system 500 is either "reset" or initialized (for example, when computer system 500 is "turned on" or "powered up") to perform tasks needed to prepare computer system 500 for normal use. In some variations of such embodiments, upon initialization or resetting of computer system 500, processor 510 accesses nonvolatile memory device 530 to retrieve instructions to be executed to prepare memory controller 551 for normal use in providing access for processor 510 to memory device 570. It may be that these same retrieved instructions are executed to prepare logic 520 for normal use in providing access to storage device 540 and whatever form of storage media 541 that may be used by storage device 540.

In some embodiments, storage media 541 carries machine-accessible instructions to be executed by processor 510 to cause processor 510 to carry out one or more tests of memory device 570 to determine what type of DRAM device memory device 570 may be, and/or to determine what functions memory device 570 may support. Such tests may include a series of attempted accesses to portions of memory device 570 and observation of the nature of the responses, received. Alternatively, such tests may include interrogating a code identifying the type of memory device or identifying the presence of one or more features, or such tests may entail reading data stored in a portion of nonvolatile memory within memory device 570 identifying the type of memory device, various parameters, and/or the presence or absence of various features. If it is determined that memory device 570 has banks of memory organized into two or more groups that are independently operable such that unrelated memory operations may be carried out within those groups, then processor 510 may be caused to program or otherwise configure memory controller 551 to make use of such separation of banks into groups. In embodiments where memory controller 551 is so programmed, memory controller 551 may have access to or incorporate a storage device such as configuration storage 552 in which to maintain data concerning the number of banks and groups, the configuration of each bank, and/or the setting of the maximum burst length to which memory device 570 has been set (if memory device 570 supports having the maximum burst length being set by a device external to memory device 570). Such data, whether stored in a specific buffer such as configuration storage 552, or not, may be used by memory controller 551 to select and/or reorder memory operations to make use of the ability of multiple groups of banks to support the carrying out of back-to-back transfers of data across memory bus 560 by alternating between groups of banks. Memory controller 551 may also be programmed with information concerning the size of cache lines within processor 510 and/or other devices within computer system 500 (not specifically shown) that have the ability to issue commands to memory controller 551 to carry out read and/or write operations with memory device 570.

Figure 6:
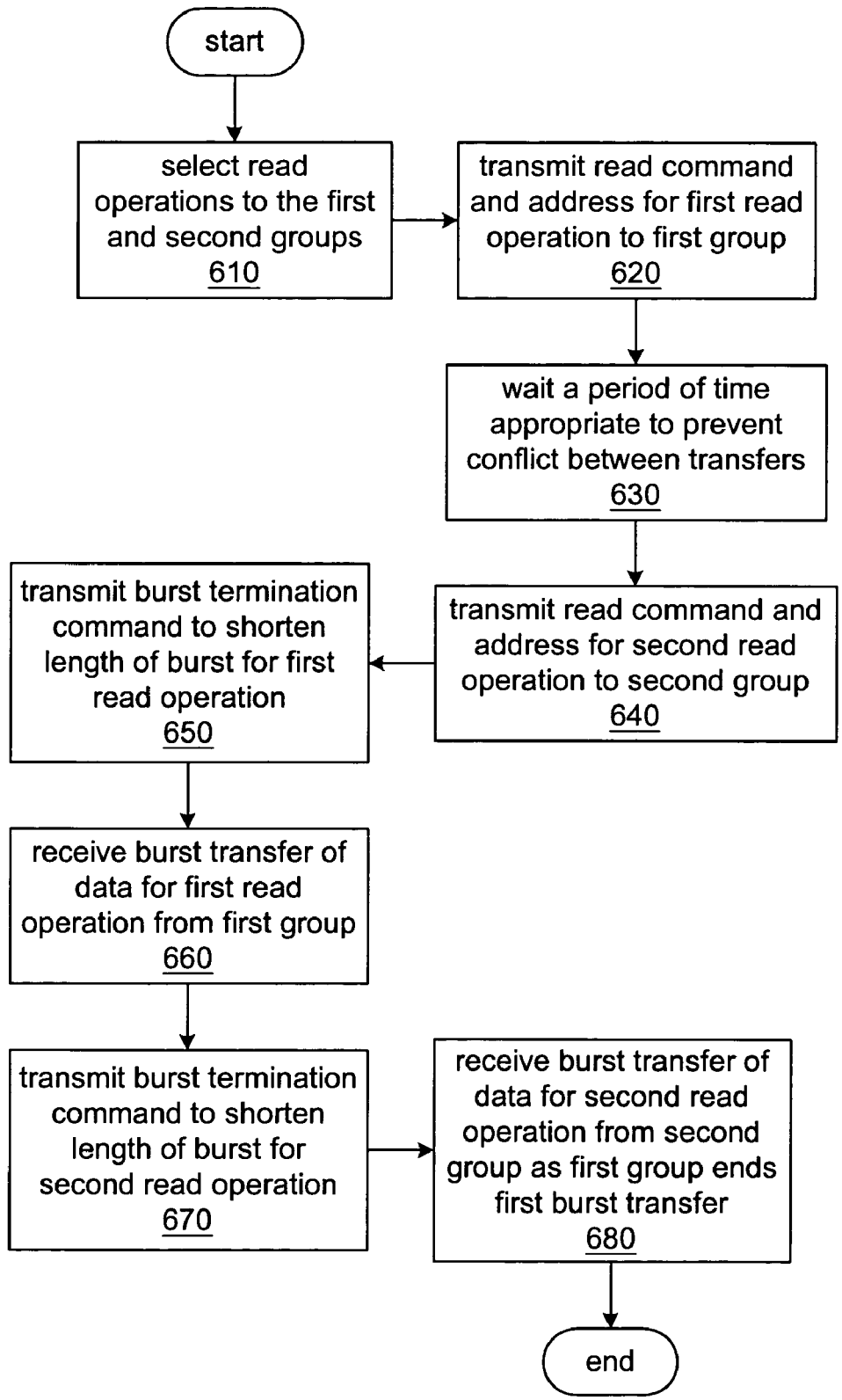
FIG. 6 is a flow chart of a method of an embodiment.

FIG. 6 is a flow chart of an embodiment of a transfer of data from a memory device with banks of memory organized into multiple groups. At 610, a controlling device, such as a memory controller, selects a pair of read operations, one of which is directed to a first row within a first group of banks of memory in the memory device, and the other of which is directed to a second row within a second group. At 620, the controlling device transmits the first read command and accompanying address to initiate a first read operation to read data from the first row within with the first group of banks of memory within the memory device. The controlling device waits for a period of time, at 630, before initiating the second read operation to read data from the second row within second group of banks of memory within the same memory device to ensure that there will not be a conflict between the transfers of data for the first and second read commands. At 640, the controlling device transmits the second read command and accompanying address to initiate a second read operation with the second group within the memory device, and then, the controlling device transmits a first burst termination command to decrease the burst length of the expected burst transfer by the memory device as part of the first read operation down to a first predetermined quantity of data at 650. At 660, the memory device transmits the first burst transfer of data from a bank within the first group as part of the first read operation, and the controlling device receives the burst transfer. The controlling device transmits a second burst termination command to decrease the burst length of the expected burst transfer by the memory device as part of the second read operation down to a second predetermined quantity of data at 670. At 680, the memory device transmits the second burst transfer of data from a bank within the second group as part of the second read operation, and the controlling device receives the burst transfer, as the first group transitions from carrying out the burst transfer portion of the first read operation to becoming available to carry out the next memory operation.

The invention has been described in conjunction with various possible embodiments. It is evident that numerous alternatives, modifications, variations and uses will be apparent to those skilled in the art in light of the foregoing description. It Will be understood by those skilled in the art that the present invention may be practiced in support of various types of electronic systems in which distributing banks of memory among multiple groups would provide a benefit. Also, although various depicted and discussed embodiments focus on the provision of two groups of banks within a memory device, It will also be understood by those skilled in the art that the present invention may be practiced in support of electronic systems other than computer systems such as audio/video entertainment devices, controller devices in vehicles, appliances controlled by electronic circuitry, etc.

What is claimed is:

1. An electronic system comprising:
   a memory IC having a first group of banks having a first bank, second group of banks having a second bank, control logic shared by both the first and second groups and having both a first state logic storing information concerning the state of all banks in the first group and a second state logic storing information concerning the state of all banks in the second group, and a data buffer;
   a memory controller having a third state logic storing information concerning the state of all banks in the first group within the memory IC, and having a fourth state logic storing information concerning the state of all banks in the second group within the memory IC; and
   a memory bus coupling the control logic and data buffer of the memory IC to the memory controller.

2. The electronic system of claim 1, wherein the control logic and the data buffer cooperate to share access to the memory bus between the first and second groups, with the control logic receiving at least addresses and commands from the memory bus for memory operations involving both the first and second groups, and with the data buffer transferring data between the memory bus and both the first and second groups.

3. The electronic system of claim 2, wherein the control logic incorporates logic to arbitrate between the first and second groups for access to the data buffer to transfer data to and from the memory bus.

4. The electronic system of claim 1, further comprising a processor coupled to the memory controller; and a cache utilized by the processor to store a subset of data stored in the memory IC.

5. The electronic system of claim 4, wherein the memory controller incorporates a control storage to maintain information concerning the size of a cache line within the cache.

6. The electronic system of claim 1, wherein the control logic stores information concerning which rows are open in all banks in the first group separately from information concerning which rows are open in all banks in the second group.

7. The electronic system of claim 1, wherein the control logic permits a read transaction to read data from a row within the first bank is able to be timed and carried entirely independently of a read transaction to read data from a row within the second bank.

8. The electronic system of claim 7, wherein the memory controller transmits addresses and commands to the memory IC for a first read transaction to read data from a first row within a bank in the first group and for second read transaction to read data from a second row within a bank in the second group, wherein the memory controller signals the memory IC that both the first and second read transactions are to be terminated early at a quantity of bytes less than the quantity of bytes that the memory IC normally fetches internally for a read transaction, wherein the memory controller times the first and second read transactions to minimize the time that elapses between the end of the actual transfer of bytes across the memory bus for the first read transaction and the beginning of the actual transfer of bytes across the memory bus for the second read transaction.

9. The electronic system of claim 8, wherein the memory controller signals the memory IC that both the first and second read transactions are to be terminated early through indications of early termination embedded in the commands transmitted to the memory IC for both the first and second read transactions.

10. The electronic system of claim 8, wherein the memory controller signals the memory IC that both the first and second read transactions are to be terminated early through transmitting first and second burst termination commands across the memory bus, timed to indicate when to cease transferring further bytes of data for each of the first and second read transactions.

11. A memory IC comprising:
a first group of banks of memory having a first bank, a first row address decoder coupled to the first bank, and a first bank selection logic coupled to the first row address decoder;
a second group of banks of memory having a second bank, a second row address decoder coupled to the second bank, and a second bank selection logic coupled to the second row address decoder, all able to operate independently of the first bank, first row address decoder and first bank selection logic;
a control logic shared by both the first and second groups, coupled to both the first and second row address decoders, coupled to both the first and second bank selection logics, storing information concerning the state of all banks in the first group, including the first bank, and separately storing information concerning the state of all banks in the second group, including the second bank; and
a data buffer shared by both the first and second groups.

12. The memory IC of claim 11, wherein the control logic and the data buffer cooperate to couple the memory IC to a memory bus and share access to the memory bus between the first and second groups, with the control logic receiving at least addresses and commands from the memory bus for memory operations involving both the first and second groups, and with the data buffer transferring data between the memory bus and both the first and second groups.

13. The memory IC of claim 12, wherein the control logic incorporates logic to arbitrate between the first and second groups for access to the data buffer to transfer data to and from the memory bus.

14. The memory IC of claim 11, wherein the control logic stores information concerning which rows are open in all banks in the first group separately from information concerning which rows are open in all banks in the second group.

15. The memory IC of claim 11, wherein a read transaction to read data from a row within the first bank is able to be timed and carried entirely independently of a read transaction to read data from a row within the second bank.

16. A method comprising:
selecting a first read operation to read data from a first row in a first group of banks in a memory IC;
selecting a second read operation to read data from a second row in a second group of banks in the memory IC;
determining a quantity of bytes to which each transfer of data will be limited for both the first and second read operations;
transmitting a first read command for the first read operation to the memory IC;
waiting a period of time appropriate to prevent conflicts between transfers of bytes for the first and second read operations and to minimize the amount of time between the end of the burst transfer of data for the first read operation to the beginning of the burst transfer of data for the second read operation;
transmitting a second read command for the second read operation to the memory IC;
receiving the burst transfer of data for the first read operation from the first row of the first group; and
receiving the burst transfer of data for the second read operation from the second row of the second group.

17. The method of claim 16, further comprising checking stored information concerning the size of a cache line of a cache utilized by a processor to temporarily store a copy of a subset of data stored in the memory IC in determining the quantity of bytes to which each transfer of data will be limited for both the first and second read operations.

18. The method of claim 16, further comprising signaling the memory IC that both the first and second read operations are to be terminated early through indications of early termination embedded in the commands transmitted to the memory IC for both the first and second read operations.

19. The method of claim 16, further comprising signaling the memory IC that both the first and second read operations are to be terminated early through transmitting first and second burst termination commands to the memory device, timed to indicate when to cease transferring further bytes of data for each of the first and second read operations.

20. A machine-accessible medium comprising code that when executed by a processor within an electronic system, causes the electronic system to:
interrogate a memory device to determine whether or not the memory device possesses banks of memory cells organized into a plurality of groups that permit independent memory operations;
configure a memory controller to make use of a memory device that possesses such independently operable groups of banks of memory cells;
check the size of a cache line of a cache utilized by a processor to temporarily store a copy of a subset of data stored in a memory device that possesses such independently operable groups of banks of memory cells; and
determine a quantity of bytes to which to limit the burst transfer of bytes of data in a read transaction from a memory device that possesses such independently operable groups of banks of memory cells.

* * * * *